Oct. 15, 1968 Z. MESZAROS 3,405,652
DEVICE FOR STARTING, CLAMPING AND CHECKING THE CLAMPING
OF VEHICLES ON A ROPE
Filed Dec. 14, 1964 2 Sheets-Sheet 2
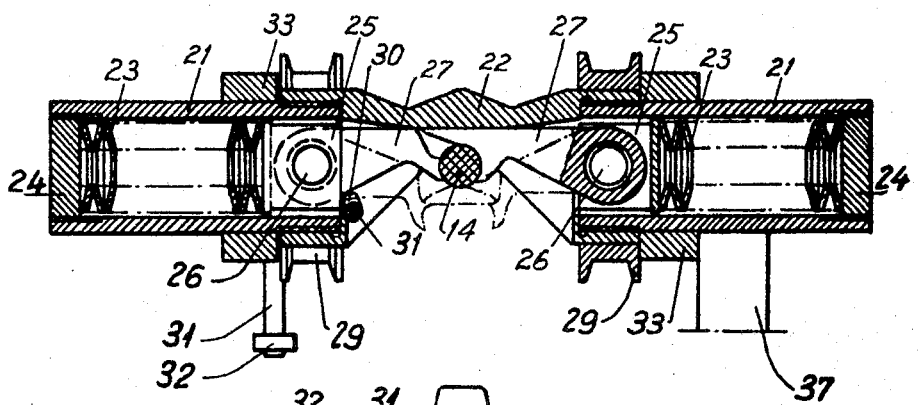
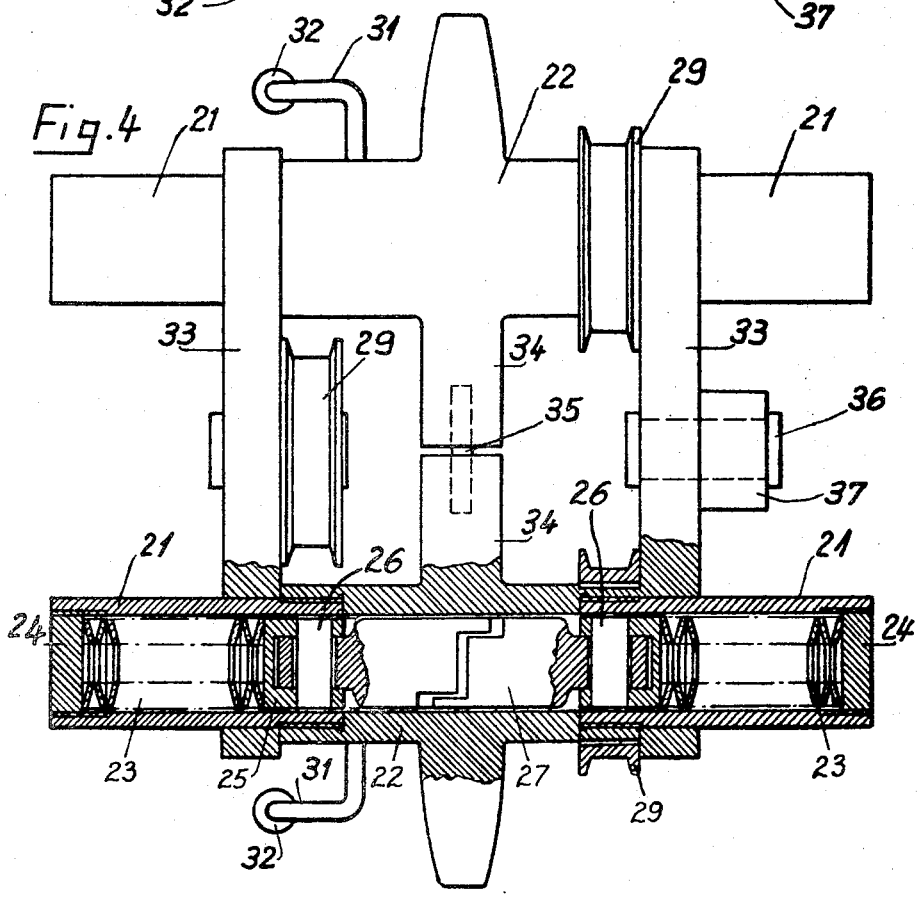
INVENTOR.
Zoltan Meszaros United States Patent Office
3,405,652
Patented Oct. 15, 1968

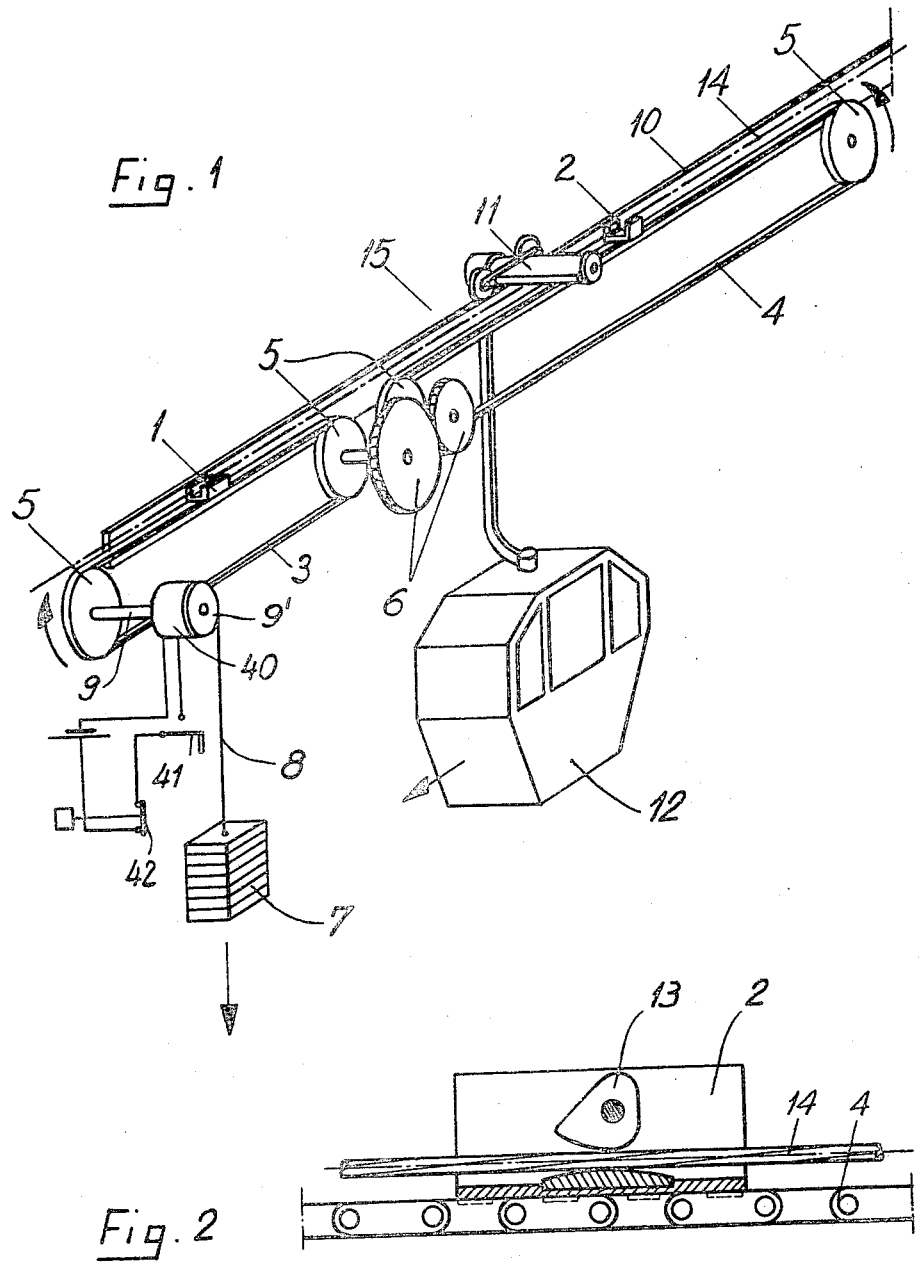

3,405,652
DEVICE FOR STARTING, CLAMPING AND
CHECKING THE CLAMPING OF VEHICLES
ON A ROPE
Zoltan Meszaros, Genossenweg 5, Bern, Switzerland
Filed Dec. 14, 1964, Ser. No. 418,046
Claims priority, application Switzerland, Dec. 27, 1963,
15,997/63, 15,998/63
5 Claims. (Cl. 104—204)

This invention relates to a device for starting, clamping and checking the clamping of the coupling of vehicles on the continuously advancing rope of an aerial cableway. This invention generally aims in improving the security of a cableway.

It is a first object of the invention to provide an automatic device for checking or testing the clamping of the coupling to the rope, this device allowing at the same time to accelerate and thereby start the vehicles. This device for starting, clamping and checking the clamping of the coupling of the vehicle on the rope broadly comprises accelerating means for said vehicles, rewindable driving means for said accelerating means and means for rewinding said driving means, said rewinding means being adapted to be actuated by the coupling of each vehicle clamped to the rope.

It is another object of this invention to provide a particularly reliable coupling for the vehicles to be clamped to the rope. This coupling device broadly comprises clamping members and springs for urging such clamping members against the rope, each clamping member being loaded by a separate independent spring system, the spring system allowing substantial opening of the clamping members at a little stroke of the spring system, but the stroke of each spring system being sufficient for producing sufficient clamping force when the other spring system is broken. In prior couplings having spring-loaded clamping jaws, the stroke of the clamping members is equal to the stroke of the springs, whereby an excessively high energy is required for opening the clamping members. When twin couplings having two pairs of clamping members are used as often prescribed, the kinetic energy of the vehicle arriving in a station of the cableway is too low for opening both sets of clamping members so that auxiliary opening devices are required. With the above coupling device according to this invention these drawbacks of prior systems are avoided and twin coupling systems may be used without any difficulty. In another prior coupling system the clamping effect of the clamping members is maintained by the own weight of the vehicle in the event of failure of a clamping spring. This system is complicated particularly when applied to twin couplings with two pairs of clamping members. This disadvantage is also avoided with my novel coupling device as set out above.

The attached drawing shows, by way of example, an embodiment of my invention.

FIG. 1 is a general perspective view of the starting and checking device,

FIG. 2 illustrates a one-way coupling used in the device of FIG. 1, on a larger scale, FIG. 3 is a cross section of a coupling device and FIG. 4 is a top view of the coupling device, partially shown in section.

The starting and checking device shown in FIGS. 1 and 2 comprises two endless chains 3 and 4 carrying driving members 1 and 2 respectively and mounted on sprocket wheels 5. The inner sprocket wheels 5 are coupled with each other by means of a transmission gear 6, so that such sprocket wheels and the upper sides of the chains 3 and 4 with the driving members 1 and 2 will always move in opposite directions as explained below.

The outer left sprocket wheel 5 is mounted on a shaft 9 together with a reel 9′ adapted to wind up a rope 8. The reel 9′ has a relatively narrow winding space so that the diameter of the windings of the rope 8 when wound onto the reel substantially increases during the winding operation. A weight 7 is suspended on the rope 8.

The coupling 11 guided on a rail 10 may be coupled with the rope 14 of the cableway in a manner well known per se at 15 near the left-hand end of chain 4.

The driving member 2 of chain 4 has an eccentric 13, FIG. 2, the rope 14 passing between this eccentric and the base of the U-shaped driving member 2. When the eccentric 13 is displaced in counterclockwise direction the rope 14 is clamped between the eccentric and the base of the driving member 2. Therefore, a one-way coupling is formed by the eccentric 13 by which the driving member 2 is coupled to the rope 14 when the speed of the member 2 towards the left exceeds the speed of the rope 14 which is continuously displaced in the same direction.

FIG. 1 illustrates the condition of the starting and checking device immediately before the coupling 11 of vehicle 12 is coupled to the rope 14. In this stage of the operation the driving member 2 engages the coupling 11 at the rear side of the latter, but the driving member is shown in a position spaced from coupling 11 for the sake of clear illustration. By the falling weight 7 the chains 3 and 4 are driven in the directions indicated by arrows in FIG. 1, whereby all driven parts, including the vehicle 12 of which the coupling 11 is engaged by the driving member 2 are accelerated. In the coupling place 15, not illustrated, the coupling 11 is coupled to the rope. Meanwhile, the weight 7 has reached a lower end position so that the chains 3 and 4 are stopped in a rest position for which the driving member 1 reaches an initial position near the right end of the upper side of chain 3. The coupling 11 which has now been coupled to the rope 14 soon engages the driving member 1 and drives the chain 3 in anticlockwise direction. By this rotation which is transmitted to shaft 9 and to the reel 9′, the rope 8 is rewound with increasing speed due to the increase of winding diameter of the rope 8, explained above. At the same time the driving member 2 mounted on chain 4 is displaced to the right and will reach an end position on the outer right sprocket wheel 5 outside the path of the coupling 11 of a next vehicle to be coupled with the rope 14. When the weight 7 is completely rewound it is latched in its upper end position by an electric coupling 40, schematically shown in FIG. 1 and which rigidly couples the shaft 9 with a stationary part of the structure whenever energized. This coupling 40 is energized when an end switch 41 is closed by the weight 7 arriving in its rewound upper end position. When starting another vehicle, the push-button switch 42 is opened temporarily whereby the circuit is opened and coupling 40 is deenergized for releasing the weight 7.

The rewinding mechanism for the weight 7 is so designed that the force required for actuating the rewinding mechanism substantially exceeds the maximum force required for driving the vehicle 12. Therefore, the rewinding mechanism automatically checks the proper clamping of the coupling 11 to the rope 14. If the clamping action is insufficient the coupling is unable to completely rewind the weight. In this case the rope 14 may be stopped manually by the operator or by any suitable automatic control circuit.

Usually, another vehicle is advanced along the rail 10 above the right-hand end of chain 4 when the driving members have reached the above initial positions and when the weight 7 has been rewound, whereafter the weight is released. In the manner already explained above, the vehicle is now accelerated towards the right by the driving member 2 engaging the rear side of the coupling 11. The accelerated vehicle is then coupled with the rope 14, whereafter the coupling of the vehicle will engage the driving member 1 and rewind the weight.

The accelerating mechanism and the weight 7 must be capable of properly accelerating fully loaded vehicles, and therefore, unloaded or partially loaded vehicles would usually be accelerated to a speed exceeding the speed of rope 14. This is prevented by the one-way coupling formed by eccentric 13 as explained above.

Instead of a rewindable weight a rewindable spring or a combination of a spring system and of a weight may be used.

FIGS. 3 and 4 show a preferred embodiment of the coupling of the cableway. The coupling comprises two pairs of spring casings 21 screw fastened in casings or bridges 22. Groups or piles of cup springs 23 are accommodated in each spring casing, the outer end of each pile of springs being seated on a screw washer 24 allowing adjustment of the spring pressure, and the inner end of each pile of springs engaging a piston 25 adapted for axial displacement along the spring casing. A clamping jaw 27 is pivoted on each of the pistons 25 by means of a horizontal pivot bolt 26. In the coupled or clamped position shown in full lines in FIG. 3 the clamping jaws 27 are in substantially horizontal position and are pressed against the rope 14 by the pressure of springs 23. The open position of the clamping jaws is shown in dash-dotted lines in FIG. 3.

The wheels 29 of the coupling are adapted to run on rails in the stations of the cableway, whereby the clamping and releasing of the clamping jaws is effected simply by lowering and lifting respectively the coupling relatively to the rope 14. The one clamping jaw of each pair of clamping jaws may be secured in closed position by means of a securing eccentric or lug 30 fixed on a rod 31 rotatably mounted in end walls of the casings 22 and carrying rollers 32 adapted for cooperation with auxiliary guide rails in the cableway stations for turning the rod 31 and securing lug 30 into the engaged position illustrated and for returning it into a released position wherein the clamping jaw may be lowered into its opened position.

The stroke of the pistons 25 is limited by the engagement of the rope by the clamping jaws or by abutment of the piston 25 against a stop, not shown.

In the twin embodiment shown in FIG. 4 the casings 22 and spring casings 21 are interconnected by means of beams 33, the spring casings 21 and casings 22 being pivotably mounted in the bores of such beams. The relative angular movement of casings 22 is limited by an elastic rod 35 mounted in adjacent portions of horizontally extending noses 34 of casings 22. The noses 34 of casings 22 also assist passage of the coupling below pressure guiding roller for the rope 14 with little vibration. The hanger 37 of the vehicle is pivotably mounted on a bolt 36 fixed in the one beam 33.

What I claim is:
1. A device for clamping vehicles to the rope of an aerial cableway, comprising two pairs of clamping members spaced from each other and accommodated in the casing portions pivotable relatively to each other round horizontal axes, each of said casing portions having a nose extending in the direction of the rope, adjacent ends of such noses being interconnected by means of an elastic member, for instance an elastic rod, each of said clamping members being loaded by a separate independent pile of cup springs accommodated each in one of two horizontal casings, this pile of cup springs allowing substantial opening of the clamping members at a little stroke of the pile of cup springs but the stroke of each pile of cup springs being dimensioned for producing sufficient clamping force when the other pile of cup springs is broken.

2. A device for clamping vehicles to the rope of an aerial cableway, comprising two pairs of clamping members spaced from each other and accommodated in casing portions pivotable relatively to each other round horizontal axes, said casing portions being interconnected by means of an elastic member, each of said clamping members being loaded by a separate independent spring system allowing substantial opening of the clamping members at a little stroke of the spring system, but the stroke of each spring system being diminished for producing sufficient clamping forces when the other spring system is broken.

3. A device for clamping vehicles to the rope of an aerial cableway, comprising at least one pair of clamping jaws pivotably mounted each by means of pivot means on a slide member, said slide members being guided for displacement in a horizontal direction, separate independent spring means acting on each of said slide members for urging said slide members and clamping jaws pivotably mounted thereon towards each other, a clamping position of the device wherein said spring means, slide members, pivot means and clamping jaws extend in a substantially horizontal plane comprising the rope, and an open position of the device wherein said clamping jaws are pivoted downwards from said rope and horizontal plane respectively, and means for limiting the stroke of each slide member in a direction opposite to the spring force acting thereon.

4. A device according to claim 3, comprising locking means for locking said clamping jaws in their clamping position.

5. A device according to claim 3, comprising a casing including side portions and an upper bridge portion interconnecting the side portions, housings mounted in said side portions for accommodation of said slide members and spring means respectively, said clamping jaws abutting against said bridge portion when in their clamping position.

References Cited
UNITED STATES PATENTS

| | | | |
|---|---|---|---|
| 913,775 | 3/1909 | Seymour | 104—209 |
| 1,011,535 | 9/1911 | Webber | 104—209 |

FOREIGN PATENTS

| | | |
|---|---|---|
| 874,941 | 8/1961 | Great Britain. |
| 448,298 | 3/1949 | Italy. |

ARTHUR L. LA POINT, *Primary Examiner.*

D. F. WORTH, *Assistant Examiner.*